(12) United States Patent
Evans et al.

(10) Patent No.: US 10,343,137 B2
(45) Date of Patent: Jul. 9, 2019

(54) METHOD FOR PREPARING A SORBENT

(71) Applicant: JOHNSON MATTHEY PUBLIC LIMITED, London (GB)

(72) Inventors: Matthew James Evans, Durham (GB); Paul Thomas Foran, North Yorkshire (GB); Matthew David Gwydion Lunn, Durham (GB)

(73) Assignee: Johnson Matthey Public Limited Company, London, England (GB)

( * ) Notice: Subject to any disclaimer, the term of this patent is extended or adjusted under 35 U.S.C. 154(b) by 445 days.

(21) Appl. No.: 15/036,817

(22) PCT Filed: Dec. 4, 2014

(86) PCT No.: PCT/GB2014/053605
§ 371 (c)(1),
(2) Date: May 16, 2016

(87) PCT Pub. No.: WO2015/092358
PCT Pub. Date: Jun. 25, 2015

(65) Prior Publication Data
US 2016/0279596 A1  Sep. 29, 2016

(30) Foreign Application Priority Data
Dec. 18, 2013 (GB) .................. 1322462.1

(51) Int. Cl.
*B01J 20/30* (2006.01)
*B01J 20/12* (2006.01)
*B01J 20/08* (2006.01)
*B01J 20/28* (2006.01)
*B01J 20/32* (2006.01)
*B01D 53/64* (2006.01)
*B01J 20/02* (2006.01)
*B01D 53/02* (2006.01)
*B01D 53/14* (2006.01)

(52) U.S. Cl.
CPC ............. *B01J 20/12* (2013.01); *B01D 53/02* (2013.01); *B01D 53/14* (2013.01); *B01D 53/64* (2013.01); *B01J 20/0237* (2013.01); *B01J 20/0277* (2013.01); *B01J 20/0285* (2013.01); *B01J 20/08* (2013.01); *B01J 20/2803* (2013.01); *B01J 20/3028* (2013.01); *B01J 20/3042* (2013.01); *B01J 20/3085* (2013.01); *B01J 20/3204* (2013.01); *B01J 20/3236* (2013.01); *B01J 20/3293* (2013.01); *B01J 20/3295* (2013.01); *B01D 2252/10* (2013.01); *B01D 2253/104* (2013.01); *B01D 2253/1128* (2013.01); *B01D 2253/25* (2013.01); *B01D 2256/16* (2013.01); *B01D 2256/20* (2013.01); *B01D 2256/24* (2013.01); *B01D 2257/602* (2013.01); *B01D 2258/025* (2013.01)

(58) Field of Classification Search
None
See application file for complete search history.

(56) References Cited

U.S. PATENT DOCUMENTS

| | | | |
|---|---|---|---|
| 5,245,106 A | 9/1993 | Cameron et al. | |
| 8,177,983 B2 * | 5/2012 | Cousins | ................. B01D 53/64 210/688 |
| 8,197,695 B2 * | 6/2012 | Cousins | ............... B01J 20/0237 210/688 |
| 2007/0037991 A1 * | 2/2007 | Rizkalla | ................... B01J 21/04 549/533 |
| 2007/0122327 A1 | 5/2007 | Yang et al. | |
| 2009/0297885 A1 | 12/2009 | Gadkaree et al. | |
| 2010/0320153 A1 | 12/2010 | Cousins et al. | |
| 2011/0123422 A1 | 5/2011 | Wang | |
| 2013/0053234 A1 * | 2/2013 | Fish | ....................... B01D 53/64 502/10 |

FOREIGN PATENT DOCUMENTS

| | | |
|---|---|---|
| WO | WO9717307 A2 | 5/1997 |
| WO | 2009/101429 A1 | 8/2009 |
| WO | WO2010061212 A1 | 6/2010 |
| WO | 2011021024 | 2/2011 |
| WO | WO2011021024 A1 | 2/2011 |
| WO | 2013045883 | 4/2013 |

OTHER PUBLICATIONS

International Search Report PCT/GB2014/053605 dated Apr. 8, 2015.

* cited by examiner

*Primary Examiner* — Anita Nassiri-Motlagh
(74) *Attorney, Agent, or Firm* — BakerHostetler

(57) ABSTRACT

A method for preparing a sorbent precursor, which may be sulphided and used to remove heavy metals such as mercury from fluid streams, includes the steps of:
  (i) mixing together an inert particulate support material and one or more binders to form a support mixture,
  (ii) shaping the support mixture by granulation in a granulator to form agglomerates,
  (iii) coating the agglomerates with a coating mixture powder including a particulate copper compound and one or more binders to form a coated agglomerate, and
  (iv) drying the coated agglomerate to form a dried sorbent precursor.

16 Claims, No Drawings

METHOD FOR PREPARING A SORBENT

This invention relates to a method for preparing a sorbent, in particular a method for preparing sorbents comprising copper.

Copper sulphide containing sorbents may be used to remove heavy metals from fluid streams. Heavy metals such as mercury are found in small quantities in fluid streams such as hydrocarbon or other gas and liquid streams. Arsenic and antimony may also be found in small quantities in hydrocarbon streams. Mercury, in addition to its toxicity, can cause failure of aluminium heat exchangers and other processing equipment. Therefore there is a need to efficiently remove these metals from fluid streams, preferably as early as possible in the process flowsheet.

Copper sorbents are conventionally pelleted compositions or granules formed from precipitated compositions containing copper.

WO2011/021024 discloses a method for making a sorbent comprising the steps of: (i) applying, from a solution or a slurry, a layer of a copper compound on the surface of a support material, and (ii) drying the coated support material, wherein the thickness of the copper compound layer on the dried support is in the range 1-200 µm. In the Examples, the layer of copper compound was formed from a solution of copper amine carbonate or from a slurry of basic copper carbonate. The precursor was converted to a sorbent suitable for removing heavy metals from liquids or gases by applying one or more sulphur compounds to sulphide the copper compound and form CuS.

Whereas this method provides coated copper sorbents, there is a need to improve physical properties of the sorbents, such as attrition, for more challenging duties.

Accordingly the invention provides a method for preparing a sorbent precursor comprising the steps of:
(i) mixing together an inert particulate support material and one or more binders to form a support mixture,
(ii) shaping the support mixture by granulation in a granulator to form agglomerates,
(iii) coating the agglomerates with a coating mixture powder comprising a particulate copper compound and one or more binders to form a coated agglomerate, and
(iv) drying the coated agglomerate to form a dried sorbent precursor.

The invention further provides a method for preparing a sorbent comprising the step of sulphiding the sorbent precursor with one or more sulphur compounds.

The invention further provides a sorbent obtainable by the method and the use of the sorbent in removing heavy metals from heavy metal-containing fluid streams.

By "sorbent" we include absorbent and adsorbent.

By "inert particulate support material" we mean that the support material does not comprise a particulate copper compound. Such support materials include alumina, metal-aluminate, silica, titania, zirconia, zinc oxide, aluminosilicates, zeolites, metal carbonate, silicon carbide, carbon, or a mixture thereof. The support material offers a means to adapt the physical properties of the sorbent to the duty. Thus the surface area, porosity and crush strength of the sorbent may suitably be tailored to its use. Support materials are desirably oxide materials, such as aluminas, titanias, zirconias, silicas and aluminosilicates, or mixtures of two or more of these. Hydrated oxides may also be used, for example alumina trihydrate or boehmite. Particularly suitable supports are aluminas and hydrated aluminas, especially alumina trihydrate. The particulate support material is desirably in the form of a powder, more preferably a powder with a $D_{50}$ particle size in the range 1-100 µm, especially 5-20 µm.

Binders that may be used to prepare the agglomerates include clay binders such as bentonite, sepiolite, minugel and attapulgite clays; cement binders, particularly calcium aluminate cements such as ciment fondu; and organic polymer binders such as cellulose binders, or a mixture thereof. Particularly strong agglomerates may be formed where the binder is a combination of a cement binder and a clay binder. In such materials, the relative weights of the cement and clay binders may be in the range 1:1 to 3:1 (first to second binder). The total amount of the binder in the agglomerate may be in the range 5-30% by weight, preferably 5-20% by weight. The one or more binders are desirably in the form of powders, more preferably powder with a $D_{50}$ particle size in the range 1-100 µm, especially 1-20 µm.

The particulate support material and one or more binders are mixed to form a support mixture, which may be achieved by conventional blending techniques. The mixture is then granulated in a granulator to form agglomerates, which provide a core essentially free of copper compounds. The agglomerates may be formed by mixing a powder composition with a little liquid such as water, insufficient to form a slurry, and then causing the composition to agglomerate into roughly spherical granules in a granulator. The amount of liquid added will vary depending upon the porosity and wettability of the components, but may be 0.1 to 0.5 ml/g of support mixture. Aqueous or non-aqueous liquids may be used, but water is preferred. Granulator equipment is available commercially. The agglomerates preferably have a diameter in the range 1-15 mm.

The agglomerates may be aged and/or dried before coating to enhance their strength. Ageing and/or drying is preferably performed at 20-50° C. for 1-10 hours, more preferably 5-8 hours.

In a preferred embodiment the agglomerates comprise alumina trihydrate, a cement binder and a clay binder. The preferred amounts of cement and clay binders are 5-15% by weight each, in the agglomerate. Such agglomerates provide a high strength core on which to place the particulate copper compound.

The particulate copper compound suitable for use in the sorbent precursor is desirably one that may be readily sulphided such as copper oxide and/or basic copper carbonate. One or more sulphidable copper compounds may be present. A preferred particulate copper compound comprises basic copper carbonate. The particulate copper compound may be commercially sourced or may be generated, e.g. by precipitation from a solution of metal salts using alkaline precipitants. Thus the particulate copper compound may be made by precipitating copper-hydroxycarbonate and optionally zinc-hydroxycarbonate using an alkali metal carbonate and/or alkali metal hydroxide precipitant mixture, followed by washing and drying the precipitate. Thus the particulate copper compound may include one or more of azurite $Cu_3(CO_3)_2(OH)_2$; malachite $Cu_2CO_3(OH)_2$; zincian malachite $Cu_{2-x}Zn_xCO_3(OH)_2$; rosasite $Cu_{2-x}Zn_xCO_3(OH)_2$, aurichalcite $Cu_{5-x}Zn_x(CO_3)_2(OH)_6$ and alumina-containing copper-zinc hydroxycarbonate hydrotalcite-type materials where alumina is included during the precipitation, e.g. $Cu_xZn_{6-x}Al_2(OH)_{16}CO_3.4H_2O$. The particulate copper compound is desirably in the form of a powder, more a preferably a powder with an average particle size, i.e. $D_{50}$, in the range 5-100 µm, especially 10-50 µm.

Unlike the granulated or extruded products, the copper content of the sorbent precursor is relatively low and is preferably in the range 0.5-30% by weight (expressed as copper present in the dried sorbent precursor), more preferably 5-20% by weight. Although this level is less than half of the copper in conventional granulated materials, the effectiveness of the coated sorbents has surprisingly been found to match these products in terms of mercury captured.

The coating mixture comprises a particulate copper compound and one or more binders. The same or different binders as used in the agglomerates may be used. The total binder content of the coating mixture may be in the range 5-20% by weight, but is preferably 5-15% by weight. In particular we have found that a coating mixture comprising a particulate copper compound and a clay binder as the sole binder, to be particularly effective in preparing attrition resistant sorbents. Thus the coating mixture may be free of cement binder.

Other components may also be present in the coating mixture to enhance the physical properties or performance of the sorbent. Other such additives include zinc compounds such as zinc oxide, zinc carbonate or zinc hydroxycarbonate, or other transition metal compounds. However, where high water-tolerance of the sorbent is required, the metal sulphide content of the sorbent, other than copper sulphide, is preferably ≤5% by weight, more preferably ≤1% wt, most preferably ≤0.5% wt, especially ≤0.1% wt (based on the sulphided composition). If desired, additional materials may be included in the coating mixture to effect the strength or sorbency of the coating. For example, alumina materials such as high surface area transition aluminas (e.g. gamma alumina) or hydrated aluminas (e.g. alumina trihydrate or boehmite) may be included to catalyse COS hydrolysis or improve attrition resistance. The amount of the alumina or hydrated alumina may be in the range 1-15% wt of the coating mixture.

The coating mixture may be prepared by simply mixing the particulate copper compound and one or more binders, and optional other components, using conventional blending techniques.

The coating mixture may be combined with the agglomerates to form coated agglomerates that have a layer of particulate copper compound on their surface. This may be achieved by simply adding the coating mixture to the agglomerates as they are tumbled in the granulator. The coated agglomerates may be formed with or without adding additional liquid. Minimizing the amount of liquid used advantageously reduces their drying time and reduces the possibility of forming agglomerates of the coating mixture itself which is undesirable. Additional liquid may however be required where the agglomerates are dried and/or aged. The amount of liquid used may be 0.1 to 0.5 ml/g of coating mixture. Aqueous or non-aqueous liquids may be used, but water is preferred. The size of the coated agglomerates is largely determined by the size of the agglomerates. Thus the coated agglomerates preferably have a diameter in the range 1-15 mm.

The copper compound is present in a layer on the surface of the agglomerate. The thickness of the layer in the dried sorbent precursor may be in the range 1 to 1000 μm (micrometers), but preferably is in the range 1-500 micrometers, more preferably 1-250 micrometers. Thinner layers make more efficient use of the applied copper.

A particularly preferred sorbent precursor comprises a particulate basic copper carbonate coated, along with a clay binder, as a surface layer of 1 to 1000 μm thickness on the surface of agglomerates formed from a particulate hydrated alumina support material, bound together with a cement binder and a clay binder.

The coated agglomerates are dried. The drying temperature is preferably kept ≤200° C., more preferably ≤150° C. to avoid bulk decomposition of the copper compounds. Drying temperatures up to 120° C. are more preferred, for example the coated agglomerate may conveniently be dried at about 70-120° C. in air. Drying times may be in the range 0.25-16 hours.

The dried sorbent precursor may be sieved to give a desired size fraction.

The dried sorbent precursor may be sulphided to convert the copper compound to copper sulphide and the resulting copper sulphide-coated sorbent used to remove heavy metals from fluid streams. By the term "heavy metal" we include mercury, arsenic, lead, cadmium and antimony, but the sorbent of the present invention is particularly useful for removing mercury and arsenic, especially mercury from fluid streams.

Whereas the dried sorbent precursor may be calcined, e.g. by heating it to a temperature in the range 250-500° C. in air or inert gas, this is not necessary, as we have found that the copper compounds may be directly sulphided without this additional step.

The sulphiding step, which converts the copper compounds to copper (II) sulphide, CuS, may be performed by reacting the copper compound in the layer with a sulphur compound selected from hydrogen sulphide, alkali metal sulphide, ammonium sulphide, or a polysulphide. Hydrogen sulphide is preferred and may conveniently be used as a gas mixture with an inert gas. The gas mixture may, if desired, contain other sulphur compounds such as carbonyl sulphide or volatile mercaptans. The inert gases may be nitrogen, helium or argon; nitrogen is preferred. Carbon dioxide may also be used. The sulphiding gas mixture is preferably free of reducing gases such as hydrogen and carbon monoxide, but these may be present where the sulphiding step is performed at temperatures below 150° C., particularly below 100° C. Hydrogen sulphide is preferably provided to the dried sorbent precursor in gas streams at concentrations of 0.1 to 5% by volume. Sulphiding temperatures are preferably in the range 1 to 150° C., more preferably 1 to 100° C.

The sulphiding step may be performed on the dried sorbent precursor ex-situ in a sulphiding vessel through which a sulphiding agent is passed, or the sulphiding step may be performed in situ, in which case the dried sorbent precursor composition is installed and undergoes sulphidation in the vessel in which it is used to absorb heavy metals. In-situ sulphiding may be achieved using a sulphiding agent stream or where the stream containing heavy metal also contains sulphur compounds, the heavy metal-containing stream itself. Where such concomitant sulphiding and heavy metal absorption occurs, the amount of sulphur compound that is present depends on the type of sulphur compound and metal compound used. Usually, a concentration ratio, as defined by the ratio of sulphur compound (expressed as hydrogen sulphide) concentration (v/v) to heavy metal concentration (v/v), of at least one, and preferably of at least 10 is used so that the precursor is sufficiently sulphided. Should the initial concentration of the sulphur compound in the feed stream be below the level necessary to establish the desired ratio of sulphur compound to heavy metal concentration then it is preferred that the concentration of the sulphur compound is increased by any suitable method. The sulphided sorbent prepared according to the present invention is preferably pre-sulphided, in particular where the fluid to be treated contains free water.

Preferably ≥80% wt of the copper present in the sorbent precursor is sulphided, more preferably ≥90% wt, more preferably ≥95% wt. Essentially all of the sulphided copper in the sorbent is desirably in the form of copper (II) sulphide, CuS.

The sorbent may be used to treat both liquid and gaseous fluid streams containing heavy metals, in particular fluid streams containing mercury and/or arsenic. In one embodiment, the fluid stream is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in FCC processes and hydrocarbons used in solvent extraction. The hydrocarbon stream may also be a crude oil stream, particularly when the crude oil is relatively light, or a synthetic crude stream as produced from tar oil or coal extraction for example. Gaseous hydrocarbons may be treated using the process of the invention, e.g. natural gas or refined paraffins or olefins, for example. Off-shore crude oil and off-shore natural gas streams in particular may be treated with the sorbent. Contaminated fuels such as petrol or diesel may also be treated. Alternatively, the hydrocarbon may be a condensate such as natural gas liquid (NGL) or liquefied petroleum gas (LPG), or gases such as a coal bed methane, landfill gas or biogas. Gaseous hydrocarbons, such as natural gas and associated gas are preferred.

Non-hydrocarbon fluid streams which may be treated using the sorbent include carbon dioxide, which may be used in enhanced oil recovery processes or in carbon capture and storage, solvents for decaffeination of coffee, flavour and fragrance extraction, solvent extraction of coal etc. Fluid streams, such as alcohols (including glycols) and ethers used in wash processes or drying processes (e.g. triethylene glycol, monoethylene glycol, Rectisol™, Purisol™ and methanol), may be treated by the inventive process. Mercury may also be removed from amine streams used in acid gas removal units. Natural oils and fats such as vegetable and fish oils may be treated, optionally after further processing such as hydrogenation or transesterification e.g. to form biodiesel.

Other fluid streams that may be treated include the regeneration gases from dehydration units, such as molecular sieve off-gases, or gases from the regeneration of glycol driers.

The sorbent is of utility where the fluid stream contains water, preferably in low levels in the range 0.02 to 1% vol. Higher levels up to 5% vol may be tolerated for short periods. The sorbents may be regenerated simply after prolonged exposure to water simply by purging with a dry gas, preferably a dry inert gas such as nitrogen.

Preferably the sorption of heavy metal is conducted at a temperature below 150° C., preferably at or below 120° C. in that at such temperatures the overall capacity for heavy metal sorption is increased. Temperatures as low as 4° C. may be used. A preferred temperature range is 10 to 80° C. The gas hourly space velocity through the sorbent may be in the range normally employed.

Furthermore, the present invention may be used to treat both liquid and gaseous fluid streams containing one or more reductants such as hydrogen and/or carbon monoxide, notably hydrogen. In one embodiment, the fluid stream is a liquid hydrocarbon stream containing dissolved hydrogen and/or carbon monoxide. In another embodiment, the fluid stream is a gaseous stream containing hydrogen and/or carbon monoxide, i.e. a reducing gas stream. Gas streams that may benefit from this process include synthesis gas streams from conventional steam reforming processes and/or partial oxidation processes, and synthesis gas streams from a coal gasifier, e.g. as part of a IGCC process, after gas washing and heat recovery (cooling) steps, and before the sour shift stage. Other streams that may benefit from the present invention include refinery vent streams, refinery cracker streams, blast furnace gases, reducing gases, particularly hydrogen-rich gas streams, ethylene-rich streams and liquid or gaseous hydrocarbon streams, e.g. naphtha, fed or recovered from hydrotreating processes, such as hydrodesulphurisation or hydrodenitrification.

In use, the sorbent may be placed in a sorption vessel and the fluid stream containing a heavy metal is passed through it. Desirably, the sorbent is placed in the vessel as one or more fixed beds according to known methods. More than one bed may be employed and the beds may be the same or different in composition.

The invention is further described by reference to the following Examples.

EXAMPLE 1

Agglomerates were prepared according to the following recipe (all parts by weight).

100 parts aluminium trihydrate powder [$D_{50}$ 10 μm]
7 parts Ciment Fondu (calcium aluminate)
7 parts Attagel 50 (attapulgite clay)

The dry powders were mixed to ensure homogeneity before employing a granulation technique where the mixed powder placed in the granulator and combined with water (0.2 ml/g mixture) and mixed to form agglomerates in an Eirich™ granulator. The resulting agglomerates were designated material A.

A mixture of basic copper carbonate powder (100 parts by weight) ($D_{50}$ 10-20 μm) and attapulgite clay (10 parts by weight) was applied directly onto the agglomerated material A in the granulator with a little water (0.1 ml/g mixture) to and then dried at 105° C. to give dried sorbent precursor B loaded with 10% wt copper. The granules were sieved to provide a size fraction in the range 2.80-3.35 mm.

Sorbent precursor B was sulphided using 1% vol hydrogen sulphide in nitrogen at ambient temperature (20° C.) and at atmospheric pressure to produce sorbent C.

The method was repeated using a larger amount of the coating mixture on agglomerate material A to produce dried sorbent precursor D loaded with 18% wt copper.

Sorbent precursor D was sulphided using 1% vol hydrogen sulphide in nitrogen at ambient temperature and atmospheric pressure to produce sorbent E.

The method was repeated using a coating mixture on agglomerate material A to produce dried sorbent precursor J loaded with 10% wt copper.

Sorbent precursor J was sulphided using 1% vol hydrogen sulphide in nitrogen at ambient temperature and atmospheric pressure to produce sorbent K.

EXAMPLE 2

Agglomerates of material A were prepared according to the method described in Example 1.

A precipitated composition (100 parts by weight) comprising copper basic carbonate, zinc basic carbonate and alumina was mixed with attapulgite clay (10 parts by weight) and the mixture applied directly onto material A in the granulator with a little water (0.1 ml/g mixture) and then dried immediately in a laboratory fluid bed dried at 105° C. to give dried sorbent precursor F loaded with 10% wt copper.

Sorbent precursor F was sulphided using 1% vol hydrogen sulphide in nitrogen at ambient temperature and pressure to produce sorbent G.

EXAMPLE 3

Agglomerates of material A were prepared according to the method described in Example 1.

A precipitated composition (100 parts by weight) comprising copper basic carbonate and zinc basic carbonate was mixed with attapulgite clay (10 parts by weight) and the mixture applied directly onto material A in the granulator with a little water (0.1 ml/g mixture) and then dried immediately in a laboratory fluid bed dried at 105° C. to give dried sorbent precursor H loaded with 10% wt copper.

Sorbent precursor H was sulphided using 1% vol hydrogen sulphide in nitrogen at ambient temperature and pressure to produce sorbent I.

EXAMPLE 4: COMPARATIVE

A sorbent was prepared according to the method of WO2011/021024.

Washcoat preparation. 547 ml of demineralised water was heated with stirring to 52° C. 128 g of basic copper carbonate was added gradually followed by a mixture of 28 g Disperal P2 and 4 g Attagel 50. The mixture was stirred for 30 minutes and then milled using a bead mill to a particle size of 0.2-5.2 μm. The solids content of the final slurry was determined to be 19 wt % and the pH was 6.44.

Sorbent preparation. 500 g of theta/delta alumina spheres were sprayed with the above slurry to achieve an even coating. The coated spheres were dried by applying hot air (at 50° C.) during the coating process to give sorbent precursor L loaded with 10% wt copper. Precursor L was then sulphided using 1% vol hydrogen sulphide in nitrogen at ambient temperature and atmospheric pressure to produce sorbent M.

EXAMPLE 5: TESTING

Sorbents C, E, G and I were individually charged (2.80-3.35 mm size fraction, volume 25 ml) to a stainless steel reactor (21 mm ID). A flow of 100% vol natural gas was passed through a bubbler containing elemental mercury to allow the gas to pick up the mercury. The mercury-laden gas was then passed downwards through the reactor under the following conditions.

Pressure: 10 barg
Temperature 30° C.
Gas flow 110.2 NL·hr−1
Contact time 8 seconds
Test duration 690 hours Samples from the reactor inlet and exit were periodically analysed for mercury content by atomic fluorescence detection. The inlet gas had a mercury concentration of about 1,100 μg/m³. The sorbents C, E, G and I reduced the mercury content of the exit gas to below detectable limits throughout the test. At the end of each test the 25 ml sorbent bed was discharged as 9 discrete sub-beds which were ground to a fine powder and analysed by acid digestion/ICP-OES to determine total mercury content. The amount of mercury captured by each sorbent bed is shown in Table 1.

TABLE 1

| | | Sorbent C | Sorbent E | Sorbent G | Sorbent I |
|---|---|---|---|---|---|
| Mercury Loading, wt % | Bed 1 (inlet) | 2.04 | 2.24 | 1.97 | 2.23 |
| | Bed 2 | 1.10 | 0.97 | 1.01 | 1.11 |
| | Bed 3 | 0.54 | 0.53 | 0.51 | 0.71 |
| | Bed 4 | 0.19 | 0.17 | 0.24 | 0.20 |
| | Bed 5 | 0.03 | 0.06 | 0.12 | 0.13 |
| | Bed 6 | 0.01 | 0.02 | 0.08 | 0.03 |
| | Bed 7 | <0.01 | <0.01 | 0.02 | <0.01 |
| | Bed 8 | <0.01 | <0.01 | <0.01 | <0.01 |
| | Bed 9 (exit) | <0.01 | <0.01 | <0.01 | <0.01 |

All of the sorbents were effective for the removal of mercury with sorbents C and E providing the sharpest profiles.

EXAMPLE 6: MEASUREMENT OF PORE DIMENSIONS

Sorbent precursor J and sorbent K, along with comparative sorbent precursor L and sorbent M, were dried overnight at 115° C. and analysed using mercury porosimetry in order to probe their pore dimensions. The results are shown in Table 2.

TABLE 2

| | Corrected intrusion volume (cm³/g) | Entrapment (% v/v) | Median pore diameter (Å) | Pore volume (cm³/g) |
|---|---|---|---|---|
| Sorbent precursor J | 0.170 | 45 | 1583 | 0.181 |
| Sorbent K | 0.215 | 54 | 1641 | 0.247 |
| Sorbent precursor L | 0.303 | 33 | 68 | 0.394 |
| Sorbent M | 0.336 | 37 | 71 | 0.452 |

The granulated core-shell materials have a smaller pore volume than the wash-coated materials but a larger pore diameter. This suggests that they contain fewer bigger pores than the wash-coated materials which contain more pores of a smaller size. The entrapment value for the core-shell materials is larger, suggesting a more complex pore network.

The invention claimed is:

1. A method for preparing a sorbent precursor comprising the steps of:
   (i) mixing together an inert particulate support material and one or more binders to form a support mixture,
   (ii) shaping the support mixture by granulation using a liquid in a granulator to form agglomerates,
   (iii) coating the agglomerates with a coating mixture powder comprising a particulate copper compound and one or more binders to form a coated agglomerate, and
   (iv) drying the coated agglomerate to form a dried sorbent precursor;
   wherein the agglomerates are coated in step (iii) by adding the coating mixture powder to the agglomerates in the granulator.

2. The method according to claim 1 wherein the inert particulate support material is an alumina, a metal-aluminate, silicon carbide, silica, titania, zirconia, zinc oxide, an aluminosilicate, a zeolite, a metal carbonate, carbon, or a mixture thereof.

3. The method according to claim 1 wherein the inert particulate support material is an alumina or hydrated alumina.

4. The method according to claim 1 wherein the inert particulate support material is in the form of a powder with a $D_{50}$ particle size in the range of from 1-100 μm.

5. The method according to claim 1 wherein the binder used to prepare the agglomerates is a clay binder, cement binder, organic polymer binder, or a mixture thereof.

6. The method according to claim 1 wherein the agglomerates have a diameter in the range of from 1-15 mm.

7. The method according to claim 1 wherein the particulate copper compound is one or more of copper oxide, basic copper carbonate, or a precipitated material comprising copper basic carbonate and zinc basic carbonate.

8. The method according to claim 1 wherein the particulate copper compound is in the form of a powder with an average particle size, [$D_{50}$], in the range of from 5-100 μm.

9. The method according to claim 1 wherein the copper content of the dried sorbent precursor is in the range of from 0.5-30% by weight (expressed as copper present in the dried material).

10. The method according to claim 1 wherein the copper compound is present as a layer on the surface of the agglomerate and the thickness of the layer in the dried sorbent precursor is in the range of from 1 to 1000 μm (micrometers).

11. The method according to claim 1 wherein the sorbent precursor comprises a mixture of a particulate basic copper carbonate and a clay binder, as a surface layer of 1 to 1000 μm thickness coated on the surface of agglomerates formed from a particulate hydrated alumina support material, which is bound together with a cement binder and a clay binder.

12. The method according to claim 1 wherein the coated agglomerates are dried at a temperature in a range of from 70-150° C.

13. The method for preparing a sorbent comprising preparing a sorbent precursor according to claim 1 and subjecting the dried sorbent precursor to a sulphiding step to convert the copper compound to copper sulphide.

14. The method according to claim 13 wherein the sulphiding step is performed by reacting the copper compound with a sulphur compound that is hydrogen sulphide, an alkali metal sulphide, ammonium sulphide, elemental sulphur or a polysulphide.

15. The method according to claim 13 wherein the sulphiding step is performed using hydrogen sulphide at a concentration in the range of from 0.1 to 5% by volume in an inert gas.

16. The method according to claim 13 wherein the sulphiding step is performed on the dried sorbent precursor composition ex-situ in a sulphiding vessel through which a sulphiding agent is passed, or performed in situ, in which case the dried sorbent precursor composition is installed and undergoes sulphidation in the vessel in which it is used to absorb heavy metals.

* * * * *

UNITED STATES PATENT AND TRADEMARK OFFICE
CERTIFICATE OF CORRECTION

| | |
|---|---|
| PATENT NO. | : 10,343,137 B2 |
| APPLICATION NO. | : 15/036817 |
| DATED | : July 9, 2019 |
| INVENTOR(S) | : Evans et al. |

It is certified that error appears in the above-identified patent and that said Letters Patent is hereby corrected as shown below:

On the Title Page

Item (71) Applicant: delete "Johnson Matthey Public Limited" and replace with -Johnson Matthey Public Limited Company- Signed and Sealed this
Twenty-fourth Day of September, 2019

Andrei Iancu
*Director of the United States Patent and Trademark Office*